United States Patent
Koizumi (10) Patent No.: US 10,536,632 B2
(45) Date of Patent: Jan. 14, 2020

(54) IMAGING APPARATUS, CONTROL METHOD, AND NON-TRANSITORY STORAGE MEDIUM

(71) Applicant: CANON KABUSHIKI KAISHA, Tokyo (JP)

(72) Inventor: Risa Koizumi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/941,315

(22) Filed: Mar. 30, 2018

(65) Prior Publication Data

US 2018/0288309 A1    Oct. 4, 2018

(30) Foreign Application Priority Data

Apr. 4, 2017 (JP) ................. 2017-074515

(51) Int. Cl.
*H04N 5/232*    (2006.01)

(52) U.S. Cl.
CPC ..... *H04N 5/23229* (2013.01); *H04N 5/23296* (2013.01)

(58) Field of Classification Search
None
See application file for complete search history.

(56) References Cited

U.S. PATENT DOCUMENTS

| 8,830,354 B2 | 9/2014 | Nakaoka | |
|---|---|---|---|
| 2017/0018060 A1* | 1/2017 | Hamano | G02B 7/346 |

FOREIGN PATENT DOCUMENTS

| EP | 1 085 751 B1 | 11/2012 |
|---|---|---|
| JP | 2001-083407 A | 3/2001 |
| JP | 2012-155095 A | 8/2012 |

* cited by examiner

*Primary Examiner* — Mark T Monk
(74) *Attorney, Agent, or Firm* — Cowan, Liebowitz & Latman, P.C.

(57) ABSTRACT

According to an aspect of the invention, an imaging apparatus includes an imaging unit configured to read signals from pixels of an imaging element and continuously capture images, a determination unit configured to determine a reliability of focusing on the basis of a first focus detection signal output in a first imaging of the images, and a control unit configured to perform reading for acquiring a second focus detection signal from the pixels of the imaging element between the first imaging and a second imaging performed next to the first imaging in accordance with a determined reliability of focusing, in which the imaging unit performs the second imaging on the basis of the read second focus detection signal.

11 Claims, 11 Drawing Sheets

IMAGING APPARATUS, CONTROL METHOD, AND NON-TRANSITORY STORAGE MEDIUM

BACKGROUND OF THE INVENTION

Field of the Invention

The present invention relates to an imaging apparatus, a control method, and a non-transitory storage medium.

Description of the Related Art

Technologies for realizing a focus detection function and image signal acquisition by using a single imaging element have been proposed. Japanese Patent Laid-Open No. 2001-083407 discloses an imaging apparatus which uses an information acquisition pixel for focus detection as an image acquisition pixel for display or recording. This imaging apparatus divides some of pixels constituting the imaging element into a plurality of regions in a horizontal and/or vertical direction, and obtains an image signal by adding signals obtained from the divided regions at the time of image acquisition. In addition, the imaging apparatus performs reading to obtain the signals of two regions divided in the horizontal or vertical direction at the time of focus adjustment, thereby using each pixel as a pupil-divided focus adjustment signal of a phase difference system. In addition, Japanese Patent Laid-Open No. 2012-155095 discloses an imaging apparatus which reads the signals of the plurality of divided regions to a line memory and switches between whether to add the signals for each pixel and output a result as an image signal, or to independently output the signal of each region and use it as a focus adjustment signal of a phase difference system.

Processing in which an imaging apparatus with an imaging element having a pupil division reading function in which each pixel is constituted by a plurality of photoelectric conversion units performs continuous photographing while following AF is considered. As disclosed in Japanese Patent Laid-Open No. 2001-083407, the imaging apparatus performs focus adjustment by performing reading to obtain the signals of two regions divided in the horizontal or vertical direction, thereby performing focus adjustment and reading of image signals in one frame of photographing. That is, it is possible to realize continuous photographing by repeating "exposure," "reading an imaging signal," "reading for focus adjustment," "determining focus by obtaining an evaluation value based on reading for focus adjustment," and "focus adjustment on the basis of the focus determination."

However, when a focusing determination is performed on the basis of a result of the reading for focus adjustment and focus adjustment is performed, focus adjustment may not be performed due to low reliability of focusing in some cases. More specifically, when exposure is performed in a narrowed state, the depth of field becomes deep, and thus the reliability of an evaluation value (reliability of focusing) decreases. In addition, it is assumed that a line for performing both "reading an imaging signal" and "reading for focus adjustment" and a line for performing only "reading an imaging signal" and not performing "reading for focus adjustment" are mixed within one frame. In this case, if a main subject is not in the line for performing "reading for focus adjustment," the reliability of focusing becomes low. Furthermore, if SN is not good, since an evaluation value is buried in noise, the reliability of focusing becomes low.

SUMMARY OF THE INVENTION

The present invention proposes an imaging apparatus capable of continuous photographing without focusing accuracy deteriorating even if the reliability of focusing based on a focus detection signal output in each photographing is low.

According to an aspect of the invention, an imaging apparatus includes a memory, and a processor operating in accordance with a program stored in the memory. The processor comprises an imaging unit configured to read signals from pixels of an imaging element and continuously capture images, a determination unit configured to determine a reliability of focusing on the basis of a first focus detection signal output in first imaging of the images, and a control unit configured to perform reading for acquiring a second focus detection signal from the pixels of the imaging element between the first imaging and second imaging performed after the first imaging in accordance with a determined reliability of focusing, in which the imaging unit performs the second imaging on the basis of the read second focus detection signal.

Further features of the present invention will become apparent from the following description of exemplary embodiments with reference to the attached drawings.

DESCRIPTION OF THE EMBODIMENTS

Embodiment 1

Figure 1:
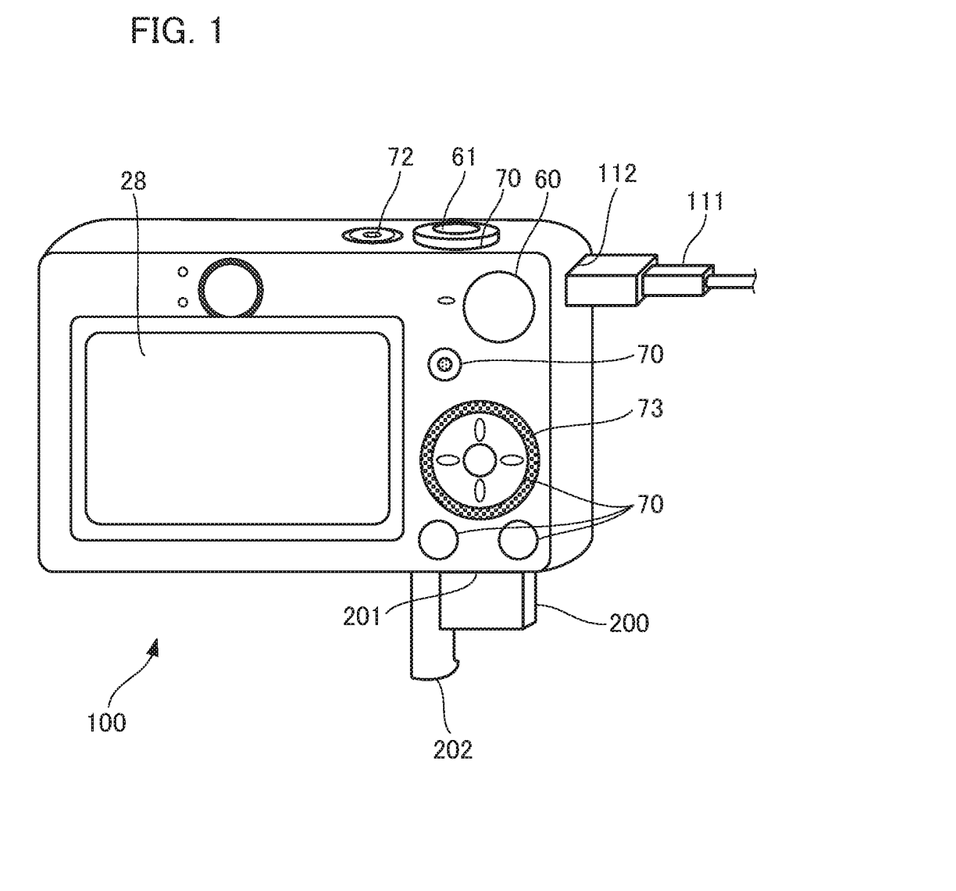
FIG. 1 is a diagram which shows the appearance of an imaging apparatus according to the present embodiment.

FIG. 1 is a diagram which shows the appearance of an imaging apparatus according to the present embodiment.

The imaging apparatus shown in FIG. 1 is a digital camera. A display unit 28 displays an image and various types of information. A shutter button 61 is an operation unit for performing a photographing instruction. A mode changeover switch 60 is an operation unit for switching various types of modes. A connector 112 is a connector between a connection cable 111 and a digital camera 100. An operation unit 70 is an operation unit having operation members such as various types of switches, buttons, touch panels, and the like for receiving various types of operations from a user. A controller wheel 73 is a rotatably operable operation member included in the operation unit 70. A power switch 72 switches power on and off. A recording medium 200 is a recording medium such as a memory card or a hard disk. A recording medium slot 201 is a slot for storing the recording medium 200. The recording medium 200 stored in the recording medium slot 201 can communicate with a digital camera 100. A lid 202 is a lid of the recording medium slot 201.

Figure 2:
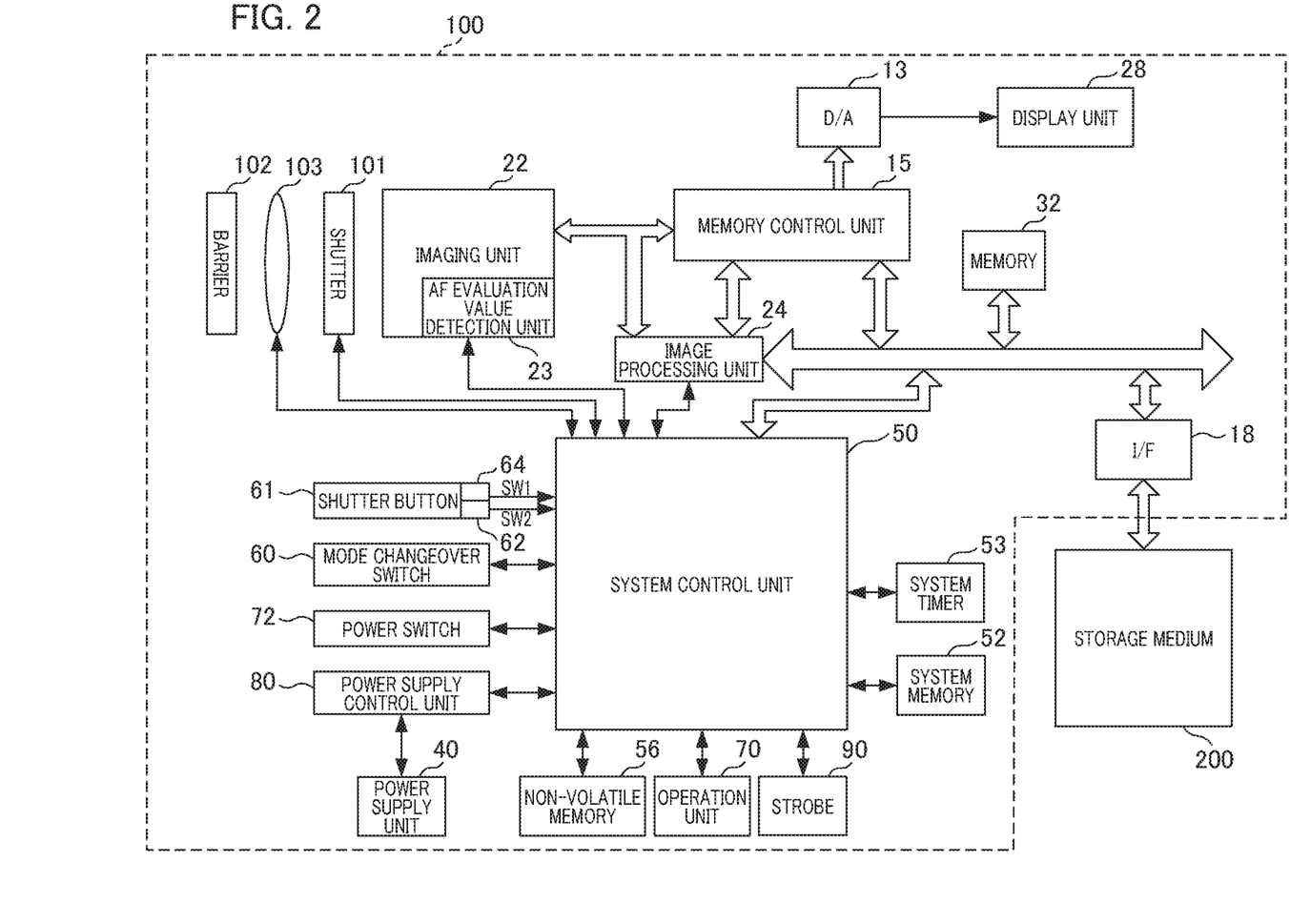
FIG. 2 is an example of the functional block diagram of a digital camera.

FIG. 2 is an example of a functional block diagram of the digital camera.

A photographing lens 103 is a lens group including a zoom lens and a focus lens. A shutter 101 has an aperture function. An imaging unit 22 includes an imaging element constituted by a CCD, a CMOS element, or the like which converts an optical image into an electrical signal. In addition, the imaging unit 22 includes an A/D conversion processing function. An AF evaluation value detection unit 23 calculates an AF evaluation value from contrast information and the like obtained from digital image signals, and outputs the obtained AF evaluation value to a system control unit 50 from the imaging unit 22. A barrier 102 prevents contamination and breakage of an imaging system including the photographing lens 103, the shutter 101, and the imaging unit 22 by covering the imaging system including the photographing lens 103. A strobe 90 compensates for illuminance at the time of photographing in a low illuminance scene or at the time of photographing in a backlight scene by emitting light at the time of photographing.

The image processing unit 24 performs resizing processing such as predetermined pixel interpolation and reduction and color conversion processing on image data output from the imaging unit 22 or image data from the memory control unit 15. In addition, the image processing unit 24 performs predetermined calculation processing using captured image data. The system control unit 50 performs exposure control and distance measurement control on the basis of a calculation result obtained by the image processing unit 24. As a result, automatic exposure (AE) processing of a through the lens (TTL) method and flash automatic dimming light emission (EF) processing are performed. In addition, the system control unit 50 uses the output of the AF evaluation value detection unit 23 in the imaging unit 22 when autofocus (AF) processing is performed. The image processing unit 24 further performs predetermined calculation processing using captured image data, and performs auto white balance (AWB) processing of the TTL method on the basis of an obtained calculation result.

The output data of the imaging unit 22 is written directly in a memory 32 via the image processing unit 24 and the memory control unit 15 or via the memory control unit 15. The memory 32 stores image data acquired and A/D-converted by the imaging unit 22, and image data to be displayed on the display unit 28. The memory 32 has enough storage capacity to store a fixed number of still images and video and sound for a predetermined time.

In addition, the memory 32 also functions as a memory for image display (a video memory). A D/A converter 13 converts data for image display stored in the memory 32 into analog signals and supplies it to the display unit 28. Image data for display written in the memory 32 is displayed by the display unit 28 via the D/A converter 13. The display unit 28 performs display in accordance with an analog signal from the D/A converter 13 on a display device such as an LCD. The digital signal which is once A/D-converted by the imaging unit 22 and accumulated in the memory 32 is converted into an analog signal by the D/A converter 13. An analog-converted signal is sequentially transferred to the display unit 28 and is displayed. As a result, an electronic viewfinder is realized and through image display can be performed.

A non-volatile memory 56 is an electrically erasable and recordable memory, and, for example, a flash memory and the like are used. The non-volatile memory 56 stores constants, programs, and the like for the operation of the system control unit 50. A program is a program for executing various flowcharts to be described below in the present embodiment.

The system control unit 50 controls the entirety of the digital camera 100. The system control unit 50 realizes processing of the present embodiment by executing the program recorded in the non-volatile memory 56. The system control unit 50 and the imaging unit 22 function as an imaging unit configured to read a signal from the pixels of the imaging element and to continuously capture an image. A RAM is used for a system memory 52. The system memory 52 develops constants, variables, programs read from the non-volatile memory 56, and the like for the operation of the system control unit 50. In addition, the system control unit 50 also executes display control by controlling the memory 32, the D/A converter 13, the display unit 28, and the like.

A system timer 53 is a timing unit that measures a time used for various types of control and a time of a built-in clock. The mode changeover switch 60, a first shutter switch 64, a second shutter switch 62, and the operation unit 70 input various operation instructions to the system control unit 50. The mode changeover switch 60 switches the operation mode of the system control unit 50 to one of a still image recording mode, a moving image recording mode, a reproduction mode, and the like. Modes included in the still image recording mode include an auto photographing mode, an auto scene determination mode, a manual mode, various scene modes which are photographing settings for each photographing scene, a program AE mode, a custom mode, and the like. A mode changeover switch 60 directly switches the operation mode to one of these modes included in the still image photographing mode. The operation mode may be switched to any one of these modes included in the still image photographing mode using other operation members after being switched to the still image photographing mode by the mode changeover switch 60. Similarly, a plurality of modes may be included in the moving image shooting mode.

The first shutter switch 62 is turned on by pressing the shutter button 61 provided in the digital camera 100 halfway (photographing preparation instruction), and generates a first shutter switch signal (SW 1 is turned ON). Operations such as auto focus (AF) processing, automatic exposure (AE) processing, auto white balance (AWB) processing, flash automatic dimming light emission (EF) processing, and the like are started by SW1 being turned on.

The second shutter switch 62 is turned on by fully pressing the shutter button 61 (photographing instruction)

and generates a second shutter switch signal (SW 2 is turned ON). The system control unit 50 starts operations of a series of photographing processing from signal reading from the imaging unit 22 to writing image data in the recording medium 200 by SW 2 being turned on.

The operation members of the operation unit 70 are assigned appropriate functions for each scene by the selection operation of various functional icons displayed on the display unit 28, and function as various functional buttons. Examples of the functional buttons include an end button, a return button, an image sending button, a jump button, a narrowing button, an attribute change button, and the like. If a menu button is pressed, a menu screen in which various settings are possible is displayed on the display unit 28. A user can intuitively perform various settings using the menu screen displayed on the display unit 28, four direction buttons corresponding to up, down, left, and right, and a SET button.

The controller wheel 73 is a rotatably operable operation member included in the operation unit 70 and is used together with a direction button to indicate a selection item, or the like. If the controller wheel 73 is operated to rotate, an electrical pulse signal is generated in accordance with an amount of the operation, and the system control unit 50 controls each unit of the digital camera 100 on the basis of the pulse signal. According to the pulse signal, it is possible to determine the rotation angle of the controller wheel 73, the number of rotations, and the like. The controller wheel 73 may be any operation member which can detects a rotation operation. For example, the controller wheel 73 may be a dial operation member that rotates by itself and generates a pulse signal in accordance with the rotation operation of a user. In addition, the controller wheel 73 is an operation member made of a touch sensor, and the controller wheel 73 itself does not rotate, and may be a member which detects the rotation operation and the like of the finger of a user on the controller wheel 73 (a so-called touch wheel).

A power supply control unit 80 has a battery detection circuit, a DC-DC converter, a switch circuit for switching blocks to be energized, and the like. The power supply control unit 80 detects whether a battery is attached, a battery type, and a remaining battery level. Moreover, the power supply control unit 80 controls the DC-DC converter on the basis of the detection result of whether a battery is attached, a battery type, and a remaining battery level, and the instruction of the system control unit 50, and supplies a necessary voltage to each unit including the recording medium 200 for a necessary period of time.

The power supply unit 40 includes primary batteries such as alkaline batteries and lithium batteries, secondary batteries such as NiCd batteries, NiMH batteries, and Li batteries, an AC adapter, and the like. A recording medium I/F 18 is an interface with the recording medium 200 such as a memory card or a hard disk. The recording medium 200 is a recording medium such as a memory card for recording a photographed image, and has a semiconductor memory, a magnetic disk, or the like.

Figure 3:
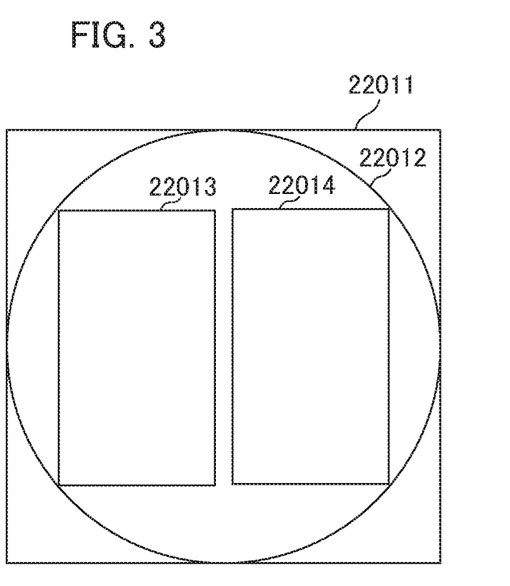
FIG. 3 is a diagram which describes a configuration of the pixels of an imaging element.

FIG. 3 is a diagram which describes a configuration of the pixels of an imaging element used in the present embodiment.

The imaging element provided in the imaging unit 22 includes a plurality of microlenses and a plurality of photoelectric conversion units (photodiodes: PD) corresponding to each microlens. For example, as shown in FIG. 3, one microlens 22012 is provided for one pixel 22011. In the example shown in FIG. 3, one pixel has two PDs 22013 and 22014 which are paired, but the number is not limited as long as it is two or more.

Figure 4:
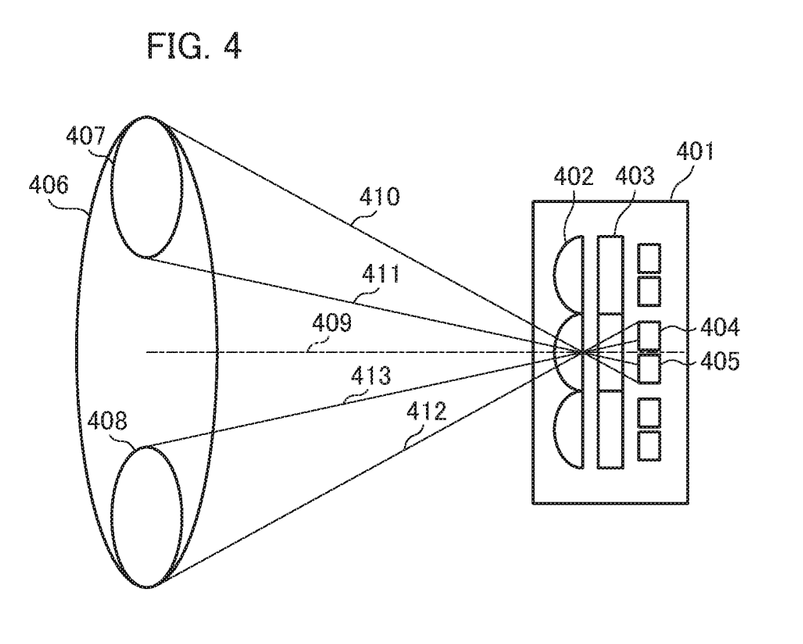
FIG. 4 is a diagram which shows incidence of a light flux emitted from an exit pupil of a photographing lens onto an imaging element.

FIG. 4 is a diagram which shows incidence of a light flux emitted from an exit pupil of photographing lens onto an imaging element.

In FIG. 4, 401 is a cross section of a pixel array, 402 is a microlens, 403 is a color filter, and 404 and 405 are PDs. The PDs 404 and 405 correspond to the PDs 22013 and 22014 in FIG. 3. 406 indicates the exit pupil of an imaging lens.

For pixels having the microlens 402, the center of the light flux emitted from the exit pupil is set as an optical axis 409. The light emitted from the exit pupil is incident on the imaging element about the optical axis 409. 407 and 408 represent a partial region of the exit pupil of the imaging lens. Light rays 410 and 411 are the outermost rays of light passing through the partial region 407 of the exit pupil. The light rays 412 and 413 are the outermost rays of light passing through the partial region 408 of the exit pupil.

As seen from FIG. 4, among the light flux emitted from the exit pupil, a light flux on the upper side is incident on the PD 405 and a light flux on the lower side is incident on the PD 404 with the optical axis 409 as a boundary. That is, the PDs 404 and 405 receive light in different regions of the exit pupil of the imaging lens. The paired PDs of the imaging element are denoted as an A pixel and a B pixel. Then, if a signal received by the PD 404 is set as an A image (hereinafter, also referred to as an "A image") and a signal received by the PD 405 is set as a B image (hereinafter, also referred to as a "B image"), it is possible to calculate an amount of focus shift on the basis of a phase difference signal between the A image and the B image and to acquire distance information. In the following description, signals received by the PD 404 and the PD 405 are described as an A+B image.

Figure 5:
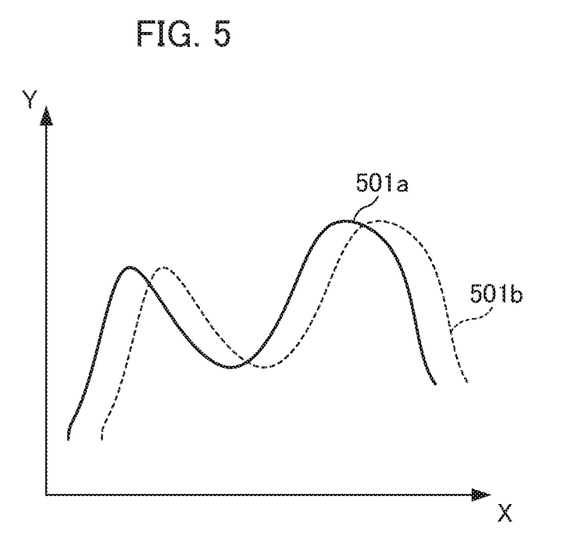
FIG. 5 is a diagram which describes a focus detection signal.

FIG. 5 is a diagram which describes a focus detection signal.

In FIG. 5, a horizontal axis X represents the position of connected signals in a pixel alignment direction, and a vertical axis Y represents the intensity of the signals. A focus detection signal 501a corresponds to the signal of the A image and a focus detection signal 501b corresponds to the signal of the B image. These signals are signals each formed as an A image signal and a B image signal which are image signals for focus detection. In the example shown in FIG. 5, since a lens 103 is in a defocus state with respect to the imaging element, the focus detection signal 501a shifts to the left side and the focus detection signal 501b shifts to the right side. By calculating the amount of shift of the signals of the A image and the B image, the amount of defocus is calculated based on the amount of image shift. That is, it is possible to detect how much the lens 103 shifts from an in-focus state.

Specifically, the system control unit 50 performs a correlation calculation for obtaining a phase difference between the A image signal and the B image signal, and performs distance measurement calculation for calculating a subject distance from the phase difference. The subject distance is a distance from the imaging apparatus to a subject, and is calculated as an amount corresponding to the amount of defocus. Equation (1) can be used to obtain a quantity U representing the degree of coincidence between the A image and the B image.

$$U = \sum_{j=0} \{(a_j - b_j)\} \tag{1}$$

where aj is the signal of a $j^{th}$ A pixel and bj is the signal of the B pixel. The amount U in Equation (1) decreases as the degree of coincidence between two images (the A image and B image) is higher, and becomes a minimum value when in focus.

Furthermore, processing for shifting the A image by p pixels relative to the B image to calculate the value of U is performed. An amount calculated by Equation (2) is denoted by P.

$$P = \sum_{j=0} \{(a_{j+p} - b_j)\} \quad (2)$$

P is the minimum value in the amount of shift at the time of focusing. On the basis of the amount of shift, the system control unit 50 calculates the amount of defocus indicating how much the lens 103 shifts from an in-focus position.

If the amount of defocus becomes zero, that is, if focused, the A image and the B image coincide with each other. However, if there is a difference between the A image and the B image, the accuracy of the imaging surface phase difference AF decreases. Therefore, for example, processing of obtaining an area of the common region of the two images, and of determining reliability in accordance with the obtained area is performed. It is determined that the reliability of focusing increases as the area is larger, and the reliability of focusing decreases as the area is smaller.

In addition, the system control unit 50 calculates the steepness of the edges of the A image and the B image. The steepness of an edge (denoted as E) is calculated using Equation (3).

$$E = \sum_{j=0} \{(|a_j - a_{j+1}|) + (|b_j - b_{j+1}|)\} \quad (3)$$

In Equation (3), when the value of E is a large value, it is determined that the reliability of focusing is high, and when the value of E is a small value, it is determined that the reliability of focusing is low.

Figure 6:
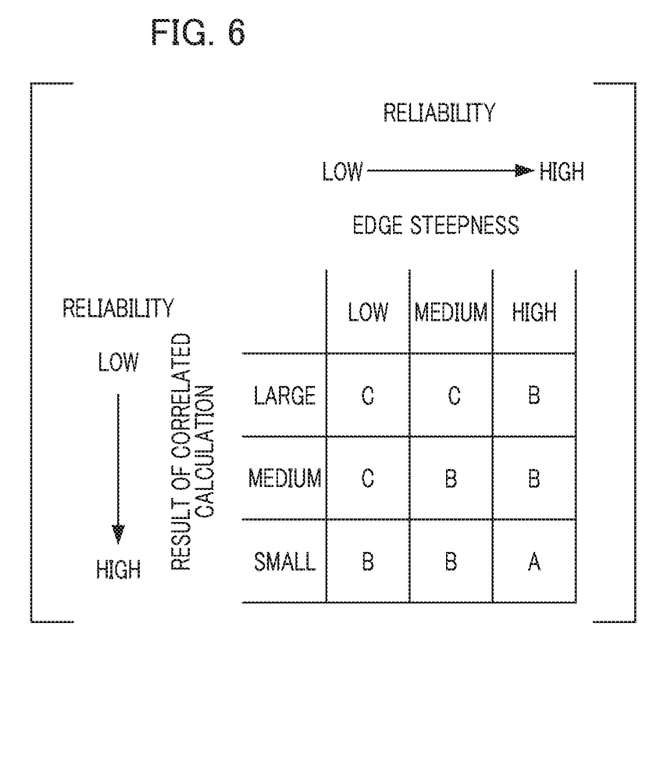
FIG. 6 is a diagram which illustrates a focusing determination table.

FIG. 6 is a diagram which illustrates a focusing determination table according to the present embodiment. The focusing determination table has three levels of state values A to C in accordance with the reliability based on a correlation calculation result and the reliability based on the steepness E of an edge. With regard to the reliability based on a correlation calculation result, it is assumed that there are three levels of "large," "medium," and "small," and the reliability increases as a correlation calculation result (the value of U) becomes smaller. In addition, with regard to the reliability based on the steepness E of an edge, it is assumed that there are three levels of "high," "medium," and "low," and the reliability increases as E becomes higher. The system control unit 50 determines the reliability of focusing on the basis of the focusing determination table, that is, on the basis of the value of U and the value of E as evaluation values.

A: The reliability of focusing is high and focusing is possible.

B: Though out of focus, the driving direction of a focus lens can be known.

C: The reliability of focusing is low and focusing is not possible.

Figure 7:
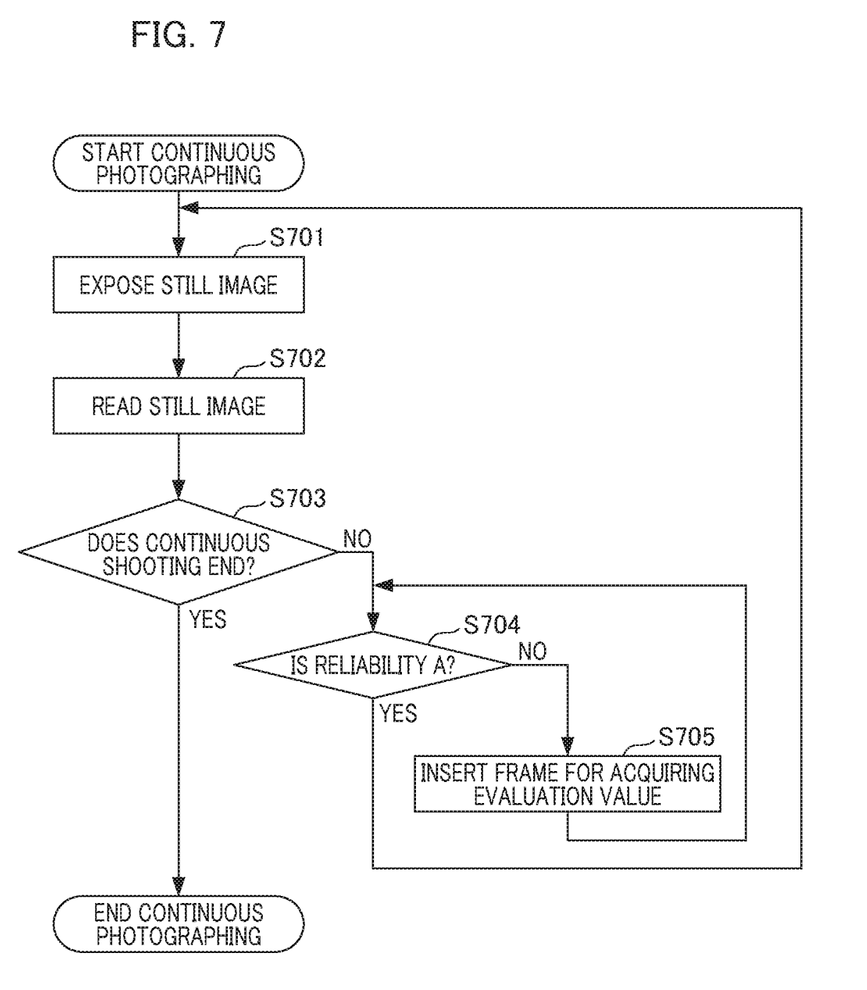
FIG. 7 is a flowchart which describes the operation processing of an imaging apparatus.

FIG. 7 is a flowchart which describes the operation processing of an imaging apparatus.

In S701, the system control unit 50 detects that the second shutter switch 61 is pressed in the continuous shooting mode, and still image exposure is performed. In addition, the system control unit 50 reads still images from the pixels of the imaging element in S702. That is, the system control unit 50 executes first imaging.

Figure 8:
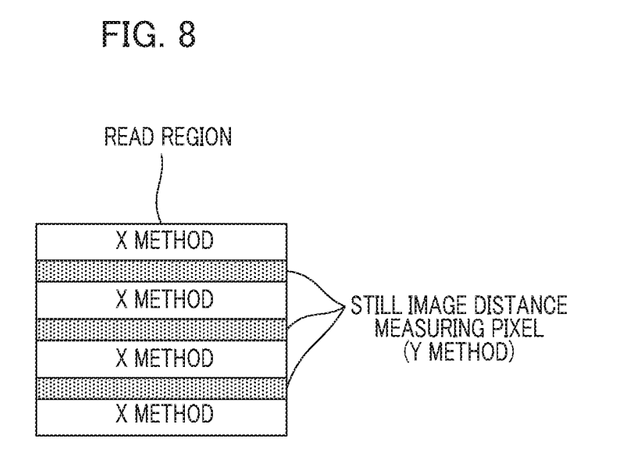
FIG. 8 is a diagram which shows an example of a read region of a still image.

FIG. 8 is a diagram which shows an example of a read region of a still image.

There are two types of reading methods in still image reading, which are X and Y to be described below.

X: An A+B image is read normally as an imaging signal.

Y: The A image, the B image, and the A+B image are read to acquire distance information of a subject.

Although it is possible to perform reading in the Y method in all the pixels shown in FIG. 8, it takes time to read, which causes a continuous photographing speed to be lowered. Therefore, in the present embodiment, reading is performed by mixing the X method and the Y method. The system control unit 50 reads a signal related to a captured image from a first read line (read line designated as the X method) included in the pixel reading area of the imaging element. Then, the system control unit 50 performs reading (reads in the Y method) for acquiring a first focus detection signal from a second read line (read line designated as a still image distance measuring pixel). Since a reading method can be changed in real time, it is possible to further improve the accuracy of focusing by changing a pixel to be read in the Y method in accordance with a subject. As a method of generating the A image, the B image, and the A+B image, there are a method of reading the A image and the A+B image and then generating the B image on the basis of the A+B image and the A image (A+B image−A image), and a method of reading the A image and the B image and generating the A+B image by adding the A image and the B image (A image+B image). However, the present invention does not limit the method of generating the A image, the B image, and the A+B image.

Figure 9:
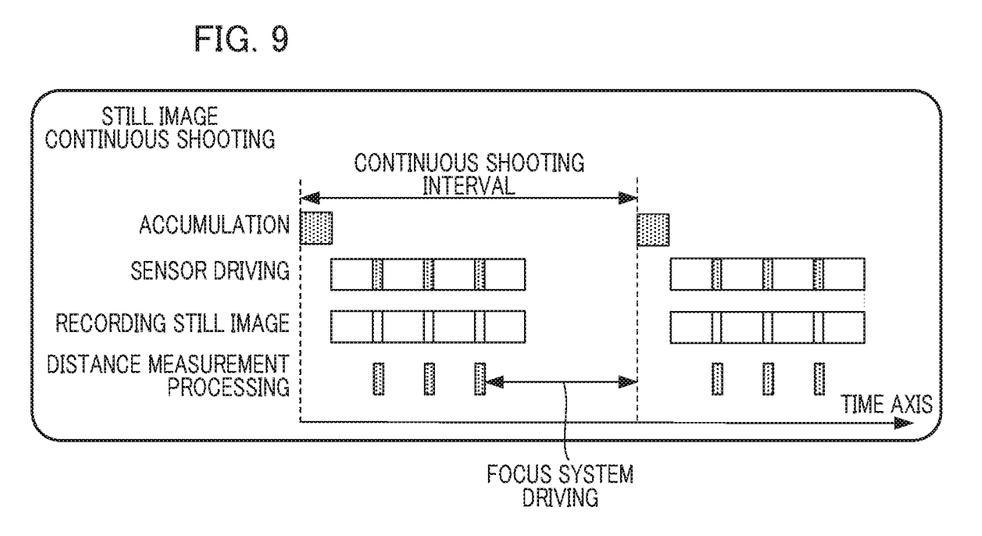
FIG. 9 is a diagram which shows a timing chart of still image exposure and still image reading.

FIG. 9 is a diagram which shows a timing chart of still image exposure and still image reading.

If the accumulation for the set exposure time portions is completed, the system control unit 50 starts reading an imaging signal. As described above, with respect to the pixel to be read in the Y method, the system control unit 50 saves the signal of the A+B image for a still image record and uses the signals of the A image and the B image (first focus detection signal) for a distance measurement calculation.

In S703 of FIG. 7, the system control unit 50 determines whether to end continuous photographing. If the second shutter switch 61 is kept pressed, the system control unit 50 determines not to end continuous shooting, and the processing proceeds to S704. If the second shutter switch 61 is not pressed, the system control unit 50 determines to end continuous shooting and ends the continuous shooting.

In S704, the system control unit 50 determines (decides) the reliability of focusing according to the focusing determination table of FIG. 6 on the basis of the signals of the A image and the B image (first focus detection signal) obtained by the reading in S702. Specifically, the system control unit 50 determines whether the reliability of focusing is a state value A (first value). The system control unit 50 determines the reliability of focusing because, when a focus lens is driven based on a result of the distance measurement calculation to perform next photographing, there is a possibility that focusing cannot be performed in the next photographing if the reliability based on the signals of the A image and the B image used for calculation processing is low.

If the reliability of focusing is the state value A, the processing proceeds to next still image photographing. If the reliability of focusing is not the state value A (B or C), the processing proceeds to S705. Subsequently, the system control unit 50 inserts an evaluation value acquisition frame to increase the reliability of focusing in S705. That is, in accordance with the reliability of focusing, the system control unit 50 performs reading for acquiring a second focus detection signal from the pixels of the imaging element between a first imaging and a second imaging performed next to the first imaging. Then, the processing returns to S704. The details of a method of inserting an evaluation value acquisition frame will be described below. Since a sequence after photographing differs in accordance with the reliability of focusing, it is necessary to read up to the signal of a pixel used for calculation processing and determine the reliability of focusing until the end of reading the signal of the A+B image to decide a next sequence.

Figure 10:
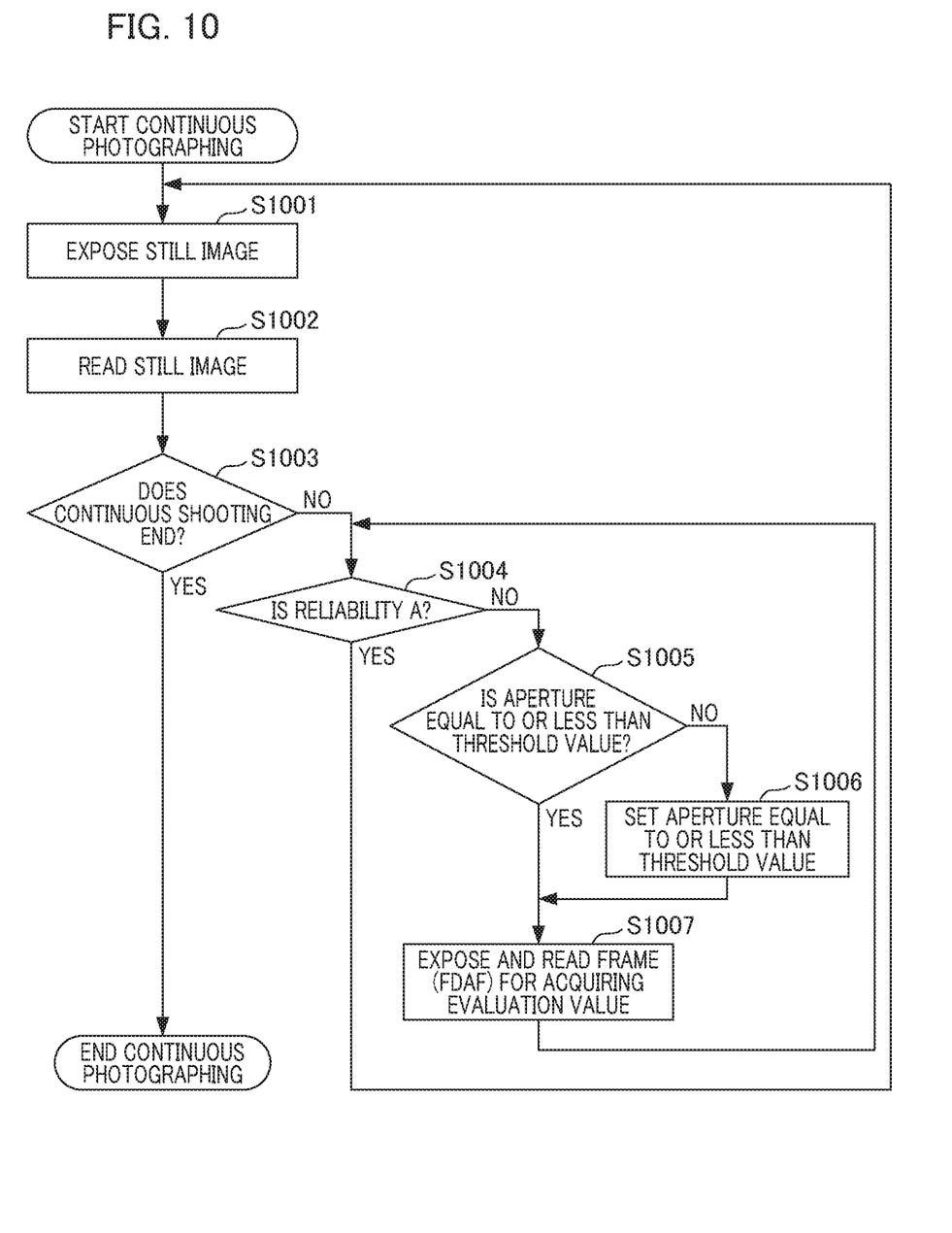
FIG. 10 is a flowchart which describes the processing of S705 of FIG. 7.

FIG. 10 is a flowchart which describes the processing of S705 of FIG. 7.

The processing of S1001 to S1004 is the same as the processing of S701 to S704 of FIG. 7. The processing of S1005 to S1007 corresponds to the processing of S705 of FIG. 7. In the determination processing of S1004, if the reliability of focusing is not the state value A, the processing proceeds to S1005. If the reliability of focusing is the state value A, the processing returns to S1001.

In S1005, the system control unit 50 acquires the aperture condition of the still image photographing and determines whether the aperture is equal to or smaller than a threshold value. If the aperture is equal to or smaller than the threshold value, the processing proceeds to S1007. If the aperture exceeds the threshold value, the processing proceeds to S1006. Subsequently, in S1006, the system control unit 50 sets the aperture to be equal to or smaller than the threshold (open side). The reason why the aperture is set to the open side is that the depth becomes deep by squeezing, it becomes impossible to acquire distance information, and the reliability of focusing decreases. In an evaluation value acquisition frame, it is possible to improve the reliability of focusing by changing to the aperture condition that can acquire the distance information. Subsequently, in S1007, the system control unit 50 performs exposure and reading of the evaluation value acquisition frame. Then, the processing returns to S1004.

Figure 11:
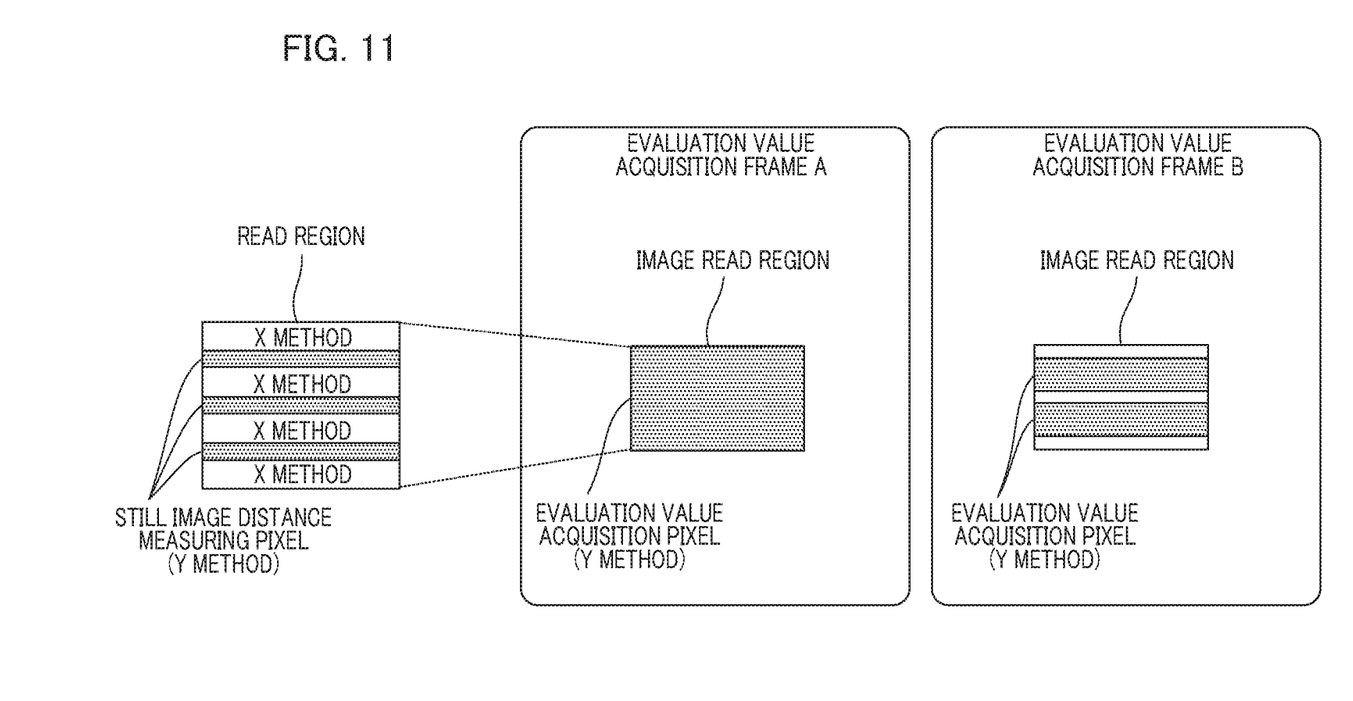
FIG. 11 is a diagram which shows an example of an evaluation value acquisition frame.

FIG. 11 is a diagram which shows an example of the evaluation value acquisition frame.

The system control unit 50 adds and reads the image read region of the evaluation value acquisition frame to the region of a still image to set the image read region to be narrower than a still image. The reason why the same area as a still image is not read is that, if the same area as a still image is read, it takes time to read it, and thus the interval of continuous photographing becomes long. In addition, the system control unit 50 reads all the read lines in the Y method in an evaluation value acquisition frame A. The purpose of inserting the evaluation value acquisition frame is to acquire a more reliable evaluation value than an evaluation value based on pixel signals acquired from a still image. Therefore, the number of pixels of a distance measurement signal for acquiring an evaluation value needs to be larger than the still image. However, if all the read lines are read in the Y method, reading time becomes longer, and thus a line to be read in the Y method may be limited like an evaluation value acquisition frame B, for example, in a scene which cannot take a long reading time to be photographed with a moving subject.

Figure 12:
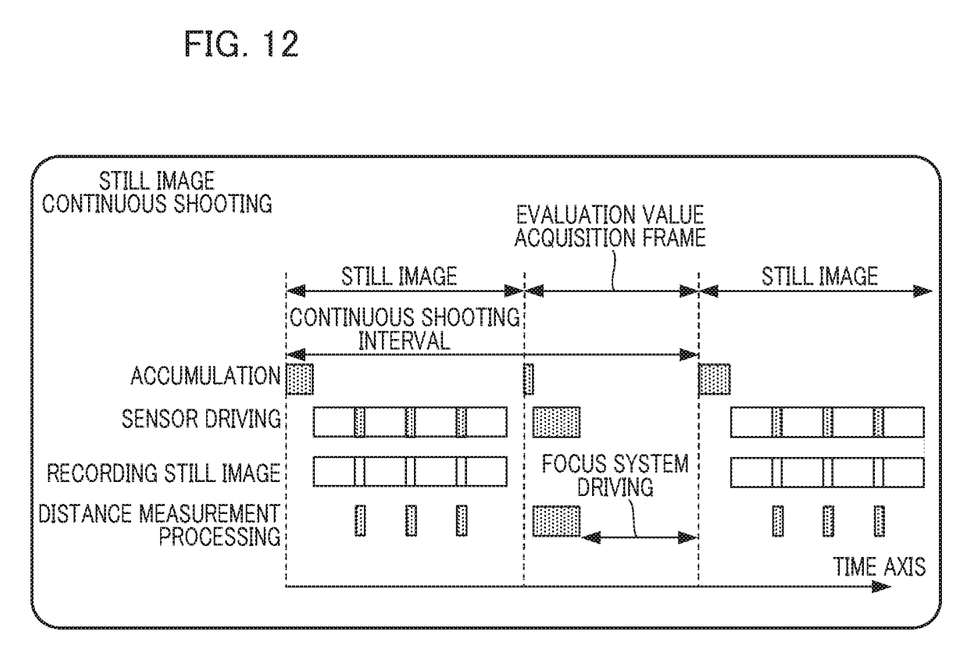
FIG. 12 is a timing chart for when the evaluation value acquisition frame is inserted.

FIG. 12 is a diagram which shows an example of a timing chart when the evaluation value acquisition frame is inserted.

After the exposure and reading of a still image are completed, the system control unit 50 performs the exposure and reading of a pixel signal for acquiring an evaluation value. Then, the system control unit 50 acquires an evaluation value from the read pixel signal for acquiring an evaluation value, and determines the reliability. If the system control unit 50 determines that the reliability is high, the processing proceeds to a next still image photographing. At this time, a distance measurement read line acquired from a still image is smaller than the distance measurement read line of an evaluation value acquisition frame. Therefore, the system control unit 50 sets a line with high reliability of focusing based on a result of the read of an evaluation value acquisition frame as the distance measurement read line of a next still image.

Embodiment 2

Figure 13:
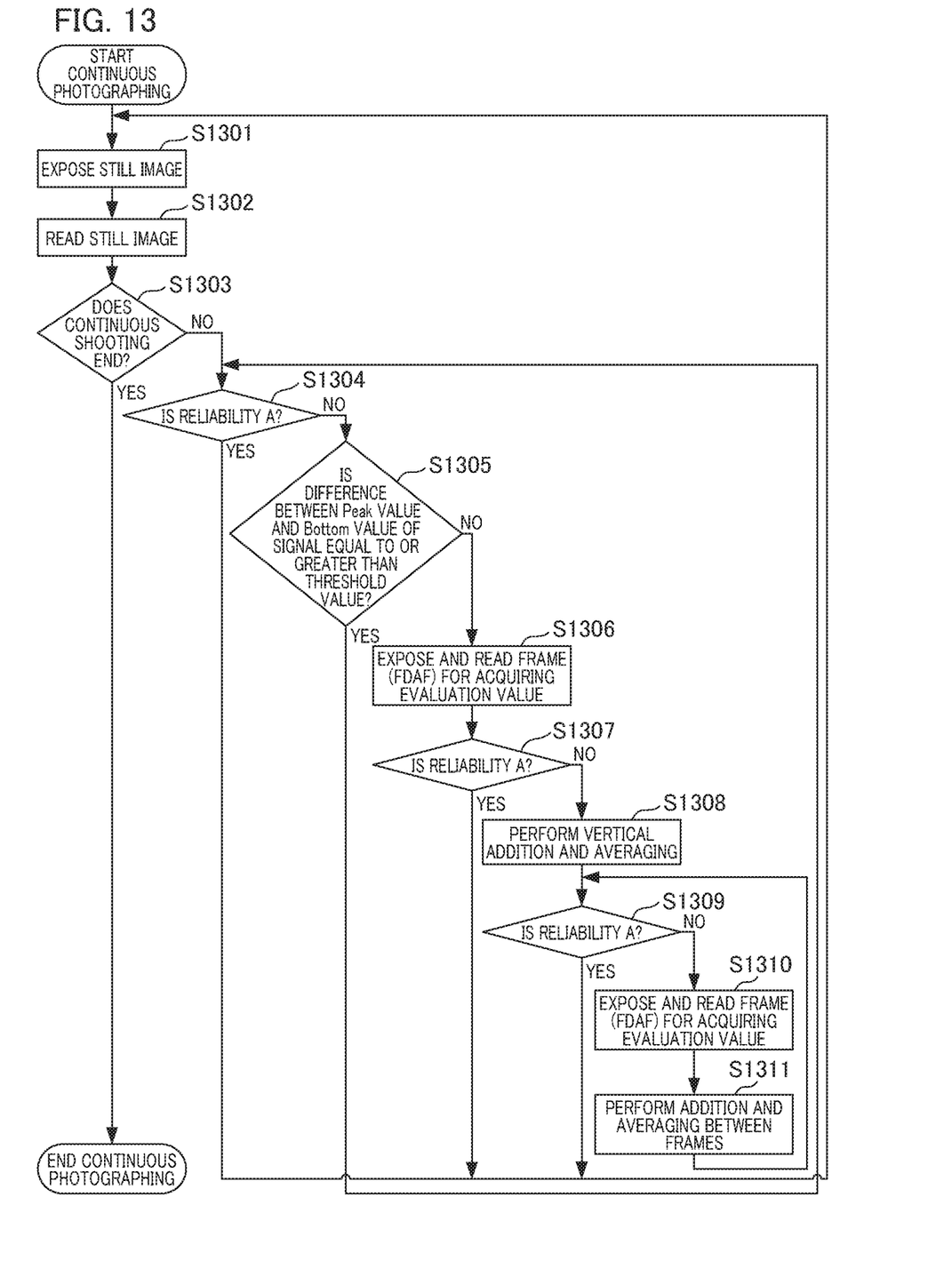
FIG. 13 is a flowchart which describes the processing of S705 of FIG. 7.

FIG. 13 is a flowchart which describes the processing of S705 of FIG. 7.

The processing of S1301 to S1304 is the same as S701 to S704 of FIG. 7. The processing of S1305 to S1311 corresponds to the processing of S705 of FIG. 7. If the reliability of focusing is not the state value A in the determination processing of S1004, the processing proceeds to S1305. If the reliability of focusing is the state value A, the processing returns to S1301.

In S1305, the system control unit 50 determines whether a difference between the maximum value and the minimum value of the signals of each of the images A and B is equal to or greater than a threshold value. If the difference between the maximum value and the minimum value of the signals is equal to or greater than the threshold value, the processing returns to S1304. If the difference between the maximum value and the minimum value of the signals is less than the threshold value, the processing proceeds to S1306. The reason for comparing the difference between the maximum value and the minimum value of the signals with the threshold value is that the accuracy of an evaluation value decreases due to the influence of noise if the difference between the maximum value and the minimum value of the signals is small.

In S1306, the system control unit 50 inserts an evaluation value acquisition frame. Since the system control unit 50 adds the evaluation value acquisition frame to and reads this from the region of a still image, the noise influence can be suppressed by a still image. Subsequently, in S1307, the system control unit 50 determines whether the reliability is the state value A by inserting an evaluation value acquisition frame. If the reliability of focusing is the state value A, the processing proceeds to the still image exposure of S1301. If the reliability of focusing is not the state value A, the processing proceeds to S1308.

In S1308, the system control unit 50 adds and averages signals related to an evaluation value acquisition frame (first frame) in a vertical direction. This is because it is possible to further suppress the influence of noise by adding and averaging signals related to a frame. Subsequently, in S1309, the system control unit 50 determines whether the reliability is the state value A as a result of the vertical addition and averaging. If the reliability is the state value A, the processing returns to S1301 and the still image exposure is performed. If the reliability is not the status value A, the processing proceeds to S1310.

In S1310, the system control unit 50 further inserts one frame of an evaluation value acquisition frame. That is, the system control unit 50 performs reading for acquiring a second focus detection signal and acquires a second frame. Subsequently, in S1311, the system control unit 50 performs addition and averaging between frames. That is, the system control unit 50 adds and averages the signal of the first frame and the signal of the second frame. Then, the processing returns to S1309. In this example, the reliability of focusing is improved by processing in the order of frame insertion, vertical addition and averaging, and addition and averaging between frames, but to which processing to proceed may be changed in accordance with the difference between the minimum value and the maximum value of the signals.

Embodiment 3

Figure 14:
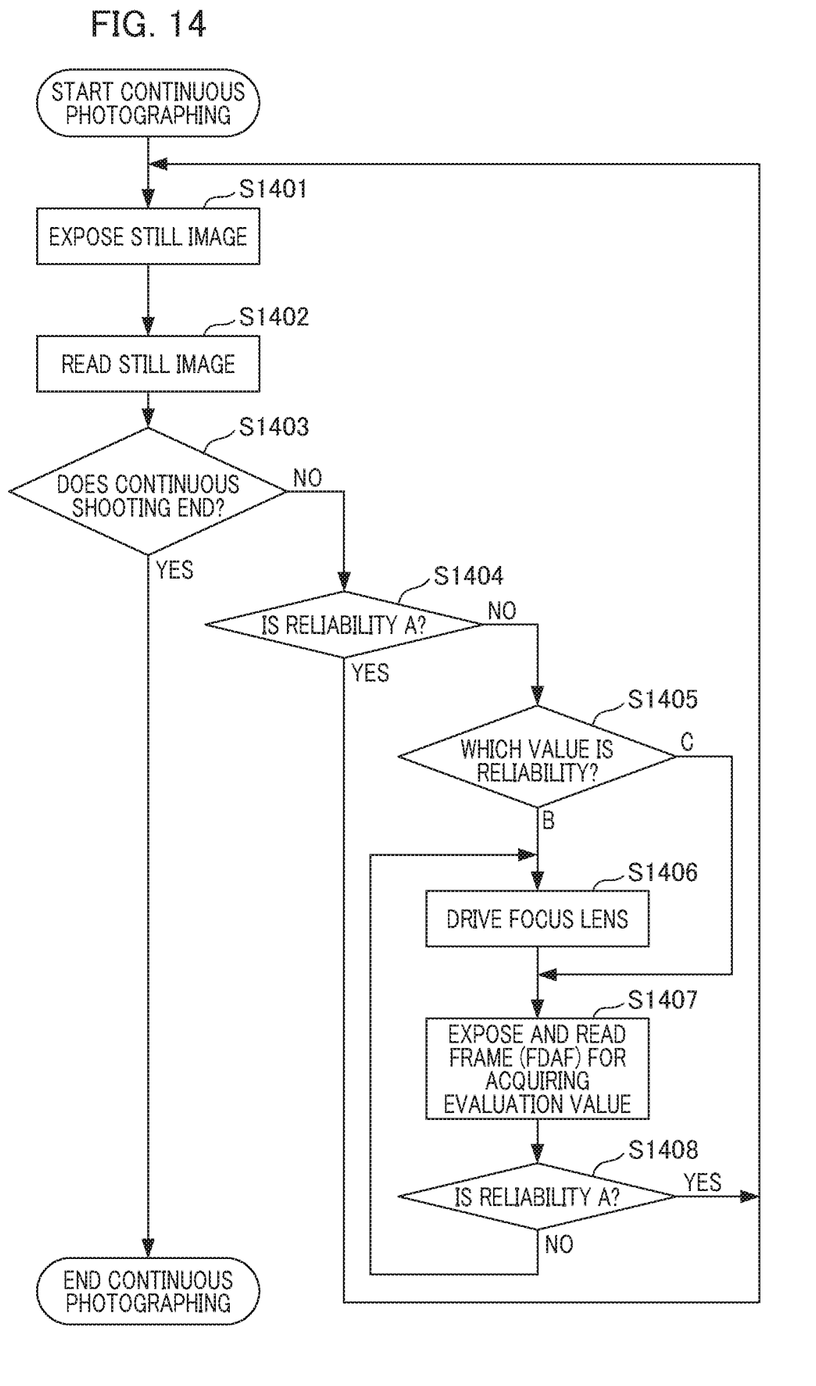
FIG. 14 is a flowchart which describes the processing of S705 of FIG. 7.

FIG. 14 is a flowchart which describes the processing of S705 of FIG. 7 in Embodiment 3.

The processing of S1401 to S1404 is the same as the processing of S701 to S704 of FIG. 7. The processing of S1405 to S1408 corresponds to the processing of S705 of FIG. 7. In the determination processing of S1404, if the reliability of focusing is the state value A, the processing returns to S1401. If the reliability of focusing is not the state value A, the processing proceeds to S1405. Subsequently, the system control unit 50 determines whether the reliability of focusing is a state value B or a state value C in S1405. If the reliability of focusing is the state value C, the processing proceeds to S1407. If the reliability of focusing is the state value B, the driving direction of a focus lens can be known. As a result, the processing proceeds to S1406.

In S1406, the system control unit 50 drives the focus lens. In S1407, the system control unit 50 inserts an evaluation value acquisition frame. Subsequently, the system control unit 50 determines whether the reliability of focusing acquired from the evaluation value acquisition frame is the state value A. If the reliability of focusing is not the state value A, the processing returns to S1406. If the reliability of focusing is the state value A, the processing returns to S1401. As described above, the system control unit 50 enables continuous photographing while maintaining focusing accuracy by inserting an evaluation value acquisition frame if the reliability of focusing is low. Although the present invention has been described in detail on the basis of preferred embodiments thereof, the present invention is not limited to these specific embodiments, and various embodiments within the scope not departing from the gist of the present invention are included. Some of the first to third embodiments described above may be appropriately combined.

Other Embodiments

The present invention can be realized in processing in which a program realizing one or more functions of the embodiments described above is provided to a system or an apparatus via a network or a storage medium, and one or more processors in the computer of the system or apparatus reads and executes the program. The present invention can be also realized by a circuit (for example, ASIC) that realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-074515 filed on Apr. 4, 2017, which are hereby incorporated by reference herein in its entirety.

What is claimed is:

1. An imaging apparatus comprising:
a memory; and
a processor operating in accordance with a program stored in the memory,
the processor comprising:
an imaging unit configured to read signals from pixels of an imaging element and continuously capture images;
a determination unit configured to determine a reliability of focusing on the basis of a first focus detection signal output in first imaging of the images; and
a control unit configured to perform reading for acquiring a second focus detection signal from the pixels of the imaging element between the first imaging and second imaging performed after the first imaging in accordance with a determined reliability of focusing,
wherein the imaging unit performs the second imaging on the basis of the read second focus detection signal.

2. The imaging apparatus according to claim 1,
wherein the control unit performs reading for acquiring the second focus detection signal when the reliability of focusing is not a first value at which focusing is possible, and does not perform reading for acquiring the second focus detection signal when the reliability of focusing is the first value.

3. The imaging apparatus according to claim 1,
wherein the control unit changes an aperture value at the time of performing reading for acquiring the second focus detection signal equal to or less than a threshold value, when an aperture value in the first imaging is not equal to or less than the threshold value.

4. The imaging apparatus according to claim 2,
wherein the control unit performs reading for acquiring the second focus detection signal, when the reliability of focusing is not the first value and a difference between a maximum value and a minimum value of the first focus detection signal is not equal to or greater than a threshold value.

5. The imaging apparatus according to claim 4,
wherein the determination unit determines the reliability of focusing on the basis of the second focus detection signal acquired by the reading, and
the control unit vertically adds and averages signals of a first frame obtained by reading for acquiring the second focus detection signal when the reliability of focusing is not the first value.

6. The imaging apparatus according to claim 5,
wherein the determination unit determines the reliability of focusing on the basis of the vertically added and averaged signal, and
the control unit performs reading for acquiring the second focus detection signal to acquire a second frame and adds and averages a signal of the second frame and a signal of the first frame when the reliability of focusing is not the first value.

7. The imaging apparatus according to claim 1,
wherein the control unit drives a focus lens to perform reading for acquiring the second focus detection signal when the determined reliability of focusing is a second value.

8. The imaging apparatus according to claim 1,
wherein the imaging unit performs reading of a signal related to a captured image from a first read line included in a pixel read region of the imaging element, and performs reading for acquiring the first focus detection signal from a second read line, and the control unit performs reading for acquiring the second focus detection signal from a region narrower than the pixel read region of the imaging element.

9. The imaging apparatus according to claim 1,
wherein the imaging element includes a plurality of microlenses and a plurality of photoelectric conversion units corresponding to each microlens, and the determination unit performs correlation calculation on image signals acquired from the plurality of photoelectric conversion units, calculates steepness of the edge of the image signal, and determines the reliability of focusing using a result of the correlation calculation and the steepness.

10. A control method comprising:
imaging in which signals are read from pixels of an imaging element and images are continuously captured;

determining in which the reliability of focusing is determined on the basis of a first focus detection signal output in first imaging of the image; and controlling in which reading for acquiring a second focus detection signal from the pixels of the imaging element between the first imaging and second imaging performed after the first imaging is performed in accordance with the determined reliability of focusing, wherein, in the imaging, the second imaging is performed on the basis of the read second focus detection signal.

11. A non-transitory storage medium on which is stored a computer program for making a computer execute a control method, the control method comprising:

imaging in which signals from pixels of an imaging element are read and images are continuously captured;

determining in which the reliability of focusing is determined on the basis of a first focus detection signal output from first imaging of the images; and controlling in which reading for acquiring a second focus detection signal from pixels of the imaging element between the first imaging and second imaging performed after the first imaging, wherein, in the imaging, the second imaging is performed on the basis of the read second focus detection signal.

* * * * *